(12) United States Patent
Eberhard et al.

(10) Patent No.: US 8,598,847 B2
(45) Date of Patent: Dec. 3, 2013

(54) BALANCING VOLTAGE FOR A MULTI-CELL BATTERY SYSTEM

(75) Inventors: Martin Eberhard, Woodside, CA (US);
Steve Diamond, San Mateo, CA (US);
Marc Tarpenning, Woodside, CA (US);
Jessica Riley, Mountain View, CA (US);
Alexander Barke, Ingolstadt (DE);
Manfred Ammler, Ingolstadt (DE);
Reinhard Hofmann, Grösdorf (DE)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 562 days.

(21) Appl. No.: 13/009,590

(22) Filed: Jan. 19, 2011

(65) Prior Publication Data

US 2012/0139491 A1      Jun. 7, 2012

Related U.S. Application Data

(60) Provisional application No. 61/420,536, filed on Dec. 7, 2010.

(51) Int. Cl.
*H02J 7/00*     (2006.01)
*H02J 7/04*     (2006.01)
*H02J 7/16*     (2006.01)

(52) U.S. Cl.
USPC ........... 320/126; 320/128; 320/132; 320/134; 320/136; 320/152

(58) Field of Classification Search
CPC ....................................................... H02J 7/1423
USPC ......................................................... 320/126
See application file for complete search history.

(56) References Cited

U.S. PATENT DOCUMENTS

| | | | |
|---|---|---|---|
| 5,998,967 A | 12/1999 | Umeki et al. | |
| 6,275,004 B1 | 8/2001 | Tamai et al. | |
| 6,844,703 B2 | 1/2005 | Canter | |
| 6,873,134 B2 * | 3/2005 | Canter et al. | 320/118 |
| 7,602,145 B2 | 10/2009 | Renda | |
| 7,723,955 B2 | 5/2010 | Zaag et al. | |
| 2008/0072859 A1 * | 3/2008 | Esaka et al. | 123/179.3 |
| 2009/0302685 A1 | 12/2009 | Kramer et al. | |

* cited by examiner

*Primary Examiner* — Edward Tso
*Assistant Examiner* — Ahmed Omar
(74) *Attorney, Agent, or Firm* — Kenyon & Kenyon LLP

(57) ABSTRACT

A method for balancing voltage for a multi-cell battery system, in which the battery system includes at least two parallel groups of cells connected in series and in which the parallel group of cells includes at least one battery cell, includes: charging the battery system by keeping the voltage of all parallel groups of cells less than or equal to a second threshold voltage value, while at least the voltage of one group of parallel cells is less than or equal to a first threshold voltage; and while at least the voltage of one group of parallel cells is less than or equal to a second threshold voltage; and while the charging current is above a predefined minimal current. The method further includes measuring the voltage of each parallel group of cells while electrical loads are shut off and dissipating energy in each of the parallel group of cells of the amount that is represented by the voltage difference between the individual parallel group of cells and the parallel group of cells with the lowest voltage.

24 Claims, 8 Drawing Sheets

BALANCING VOLTAGE FOR A MULTI-CELL BATTERY SYSTEM

CROSS-REFERENCE TO RELATED APPLICATIONS

The present application claims the benefit of U.S. Provisional Patent Application No. 61/420,536, filed on Dec. 7, 2010, which is expressly incorporated herein in its entirety by reference thereto.

FIELD OF THE INVENTION

The present invention relates to balancing batteries and more particularly relates to a method of balancing batteries for use in a electric vehicle. The present invention also relates to a cell balancing system and an electric vehicle including a cell balancing system.

BACKGROUND INFORMATION

Certain electric vehicles for transportation purposes are conventional. To achieve an acceptable range of transportation for these vehicles they have to be configured to carry and to provide the needed electrical energy to the drive train. Conventional cars have a gasoline tank in which the transportation energy is carried, and that energy is stored in the form of gasoline. The car can not drive any further if the tank is completely empty. In this case, no gas is left in the tank.

A battery system of an electric vehicle principally behaves differently than a conventional gas tank for storing energy. In an electric vehicle with multiple battery cells, the energy needed for driving is stored electrochemically in these cells. In use, the cells are usually not completely discharged or charged because this would harm the expected lifetime of the cells or even destroy the cells completely.

More importantly, continuing to charge a cell that is completely full or to discharge a cell past its recommended minimum voltage may damage the cell. In order to optimize the use and lifetime of the battery system and the useable amount of energy in the cells, a voltage balancing is usually performed on the batteries. In order to achieve an appropriate current for the traction system, the battery cells can be grouped in parallel. For balancing the battery system, the parallel group of cells, which—by definition for the present context—could include one or more cells, is provided with a discharge resistor or any other electric device capable of changing the energy content of the cells by discharging or even charging the parallel group of batteries.

The parallel group of cells are then connected in series to build a module, for example consisting of 7 to 16 parallel groups of cells. The modules are usually adapted to be replaceable in the field. It would be too difficult to replace single cells in the field. The module therefore is arranged in size and energy to serve as a field replaceable unit. The module might have one or more module controllers which are connected to a superior battery management system. To achieve a voltage level suitable and intended by the electric configuration for the electric drive train of the vehicle an appropriate number of modules is connected in series thereby adding up the voltage of the parallel groups of cells. The total stored energy in the battery cells of the battery system that can be discharged and used for the power train then determines the achievable driving range for a specific vehicle arrangement.

The cells used in the modules are usually all of the same kind but still their electrical characteristics are not exactly identical. Some reasons for the difference are: The cells might originate from different production batches, might differ in production tolerances or have experienced different environmental impacts leading to different aging processes of the cells. Usually charged batteries continuously lose a small amount of their stored energy over time by unwanted internal leakage. This energy leakage portion, for example, is also dependant on the temperature of the cells and of the power consumption of the electronics connected to the cells. If all batteries in the battery system are charged to the same level, then, after a certain time, the amount of energy left in each battery is different because of their individual internal leakage. If the batteries are discharged, for example, while driving the electric vehicle, the battery system can only be discharged to the lowest allowable state of charge of the parallel group of batteries with the lowest state of charge. The state of charge is defined as a measure of the present charge of the cell compared to its maximum charge. In this situation, it is likely that there are groups of parallel batteries which are not empty yet but which can not be discharged further because one parallel group of batteries in a module has reached its lowest allowable state of charge. In this situation, there is still energy in the battery system left that can not be used because of an imbalance of state of charge of the parallel groups of batteries. This leads to an unwanted reduced possible mileage of the electric vehicle. Similar arguments apply to charging the battery system. The parallel group of cells with the highest state of charge will terminate the charging step, because this group can not be charged anymore without harming the corresponding parallel group of cells. Therefore an unbalanced battery has at the same time unused capacity in parallel groups of cells with lower states of charge.

Certain conventional methods constantly or repeatedly track the voltage level of the batteries and constantly evaluate when balancing circuits should be turned on. Examples of this are described, for example, in U.S. Pat. No. 6,275,004, U.S. Pat. No. 7,723,955, and U.S. Pat. No. 7,602,145.

Other methods of balancing are described in U.S. Pat. No. 5,998,967 and U.S. Pat. No. 6,844,703 and involve balancing during charging by controlling the charging current to individual batteries such that all the batteries reach the same voltage at the end of the charge.

U.S. Patent Application Publication No. 2009/0302685 describes a possibility of using no uniform batteries as part of one central energy storage system. All batteries are connected to a central node via energy transfer circuit.

Also conventional is the integrated circuit LTC6802-2 from Linear Technology for battery monitoring as well as battery balancing purposes. The integrated circuit chip is capable of measuring the voltage of 12 series connected battery cells. The LTC6802-2 includes circuitry to balance cell voltages, whereas it makes no decisions about turning on or off internal switches. For these decisions a host processor has to write values to a configuration register inside the LTC6802-2 to control the switches.

SUMMARY

Example embodiments of the present invention provide an improved methodology for balancing batteries in a multi-cell battery system.

Example embodiments of the present invention provide a reliable voltage measurement of each battery module or respectively for each parallel group of cells for a method of balancing cells.

Example embodiments of the present invention safely charge all parallel groups of cells to a defined first state-of-charge value.

Example embodiments of the present invention safely charge all cells to a predefined full charge value.

Example embodiments of the present invention charge all cells to a predefined full charge value to achieve, together with a methodology of balancing a multi-cell battery system, a maximum of usable amount of energy of the battery system.

Example embodiments of the present invention balance the voltage of the parallel groups of cells by controlling the corresponding discharging energy.

Example embodiments of the present invention balance the voltage advantageously after charging the battery system.

Example embodiments of the present invention establish an optimized communication and a communication interface between the battery modules.

Example embodiments of the present invention provide a method for balancing batteries in a battery system with cells having different characteristics such as nominal voltages, state-of-charge curves, temperature behavior, and impedance.

According to example embodiments of the present invention, a method of balancing voltage for a multi-cell battery system is provided. The battery system includes at least two parallel groups of cells connected in series whereas the parallel group of cells includes at least one cell. The method includes charging the battery system by keeping the voltage of all parallel groups of cells less than or equal to a second threshold voltage value, while at least the voltage of one group of parallel cells is less than or equal to a first threshold voltage and while at least the voltage of one group of parallel cells is less than or equal to a second threshold voltage and while the charging current is above a predefined minimal current. The method further includes measuring the voltage of each parallel group of cells while electrical loads are shut off and dissipation of energy in each of the parallel group of cells of the amount that is a function of the voltage difference between the individual parallel group of cells and the parallel group of cells with the lowest voltage. The determination of the amount of energy that needs to be dissipated is executed after the charging. For example, the determination of the amount of energy is only done if the battery system has done the full charge.

Example embodiments of the present invention allow the battery system to operate optimally even when cells or groups of cells within the battery system are mismatched, either in capacity or operating voltage or both.

For example, the first threshold voltage is chosen to be a full charge voltage of the corresponding cells and the second threshold voltage is chosen to be the maximum allowed cell voltage whereas each value includes maximum measurement errors and tolerances. To ensure that internal chemical processes have come to a steady state after charging the cells, an idle period in which electrical loads are shut off is implemented.

The method may include a preceding charging where the battery system is charged by keeping the lowest voltage of the parallel groups of cells constant, while at least the voltage of one group of parallel cells is less than or equal to the first threshold voltage and while all voltages of the group of parallel cells are less than or equal to the second threshold voltage and while the charging current is above a predefined minimal current. For example, even a further preceding charging is provided where the battery system is charged for example in constant current mode or in any mode controlling the current until the lowest voltage of the parallel group of cells is equal or above to its first threshold voltage value or until the highest voltage of the parallel group of cells is equal or above its second threshold voltage value.

Another advantage in particular of example embodiments of the present invention are apparent if a battery system gets serviced for example several years after production, when a subset of cells within the battery system must be replaced. There is a high chance that the replacement cells are mismatched because they originate from different production batches or the replacement cells happen to be next generation cells having different capacity or different voltage or different energy content (Wh) or different state-of-charge per voltage. The method using at least one normalized value of the cells provides a significant advantage by being able to handle cells having different nominal values in the battery system. Instead of using voltage, also normalized values of state-of-charge, Amperehour (A*h), Watthour (Wh) or any other similar measure can be used to successfully balance the battery system.

Further features and advantages of example embodiments of the present invention are described below with reference to the accompanying drawings.

DETAILED DESCRIPTION

Figure 1:
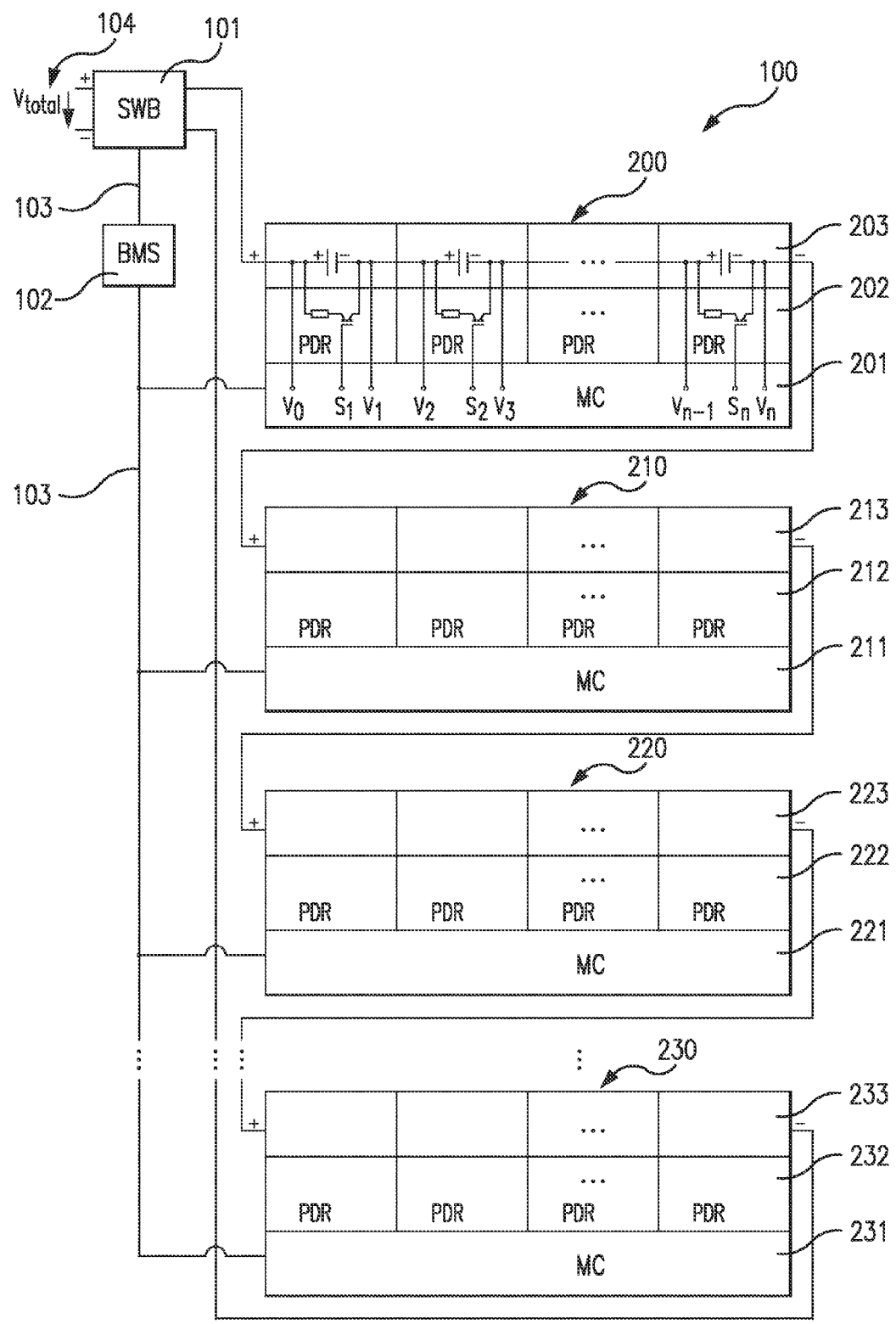
FIG. 1 shows a schematic view of a multi-cell battery system according to an example embodiment of the present invention.

FIG. 1 shows a schematic view of a multi-cell battery system 100 according to an example embodiment of the present invention.

In FIG. 1 a number of battery modules 200, 210, 220, 230 containing multi cell-batteries are electrically connected in series. The resulting total voltage of the battery cells thereby adding up to the desired battery systems' total output voltage $V_{total}$ 104, which can be accessed via the output terminals of the switchbox 101. The switchbox 101 indicated with SWB in box 101 is a subsystem of the battery system 100 and includes internal contactors that connect or disconnect the battery system's primary electrical power interfaces to an electrical load. In one example, the electrical load connected to the electrical power interface could be the sum of electrical consumers in an electrical vehicle. For connecting or disconnecting the contactors a relay or power electronic switches with power semiconductors can be used. The configuration of the system and the switchbox 101 ensures that the direct current of the battery system 100 can safely be interrupted by the switchbox 101. The switchbox 101 also includes in one example an apparatus for measuring the total current flowing into and out of the battery system 100 and an apparatus for measuring the total voltage $V_{total}$ 104 of the battery system 100. If necessary, a system for determining incoming and outgoing charges can also be implemented. This implementation could be used as a coulomb counter as part of a "gas gauge" for the battery system 100. In the switchbox 101, a microprocessor is programmed to coordinate the measuring and communication tasks and provides the necessary information via a communication link 103 to a battery monitoring system 102 indicated with BMS in box 102. The BMS 102 is also linked to the module controllers 201, 211, 221, 231 of the battery modules 200, 210, 220, 230. The microprocessor or any device fulfilling calculating or controlling tasks can also be located outside of the switchbox 101. The switchbox 101 and the BMS 102 can also be integrated into one part. In each module 200, 210, 220, 230 also included are parallel-group discharge resistors PDR 202, 212, 222, 232 indicated with PDR that together with an integrated switching device, for example, a transistor, are connected across a parallel group of cells 203, 213, 223, 233 and can be enabled or disabled by the module controller 201, 211, 221, 231 to discharge energy, for example, to accomplish the method for balancing voltage. Instead of the discharge resistors PDR 202, 212, 222, 232, a LED or a combination of resistor and LED or any electric circuit can be used that is able to change the energy content of the cells.

A parallel group of cells 203, 213, 223, 233 may include one cell as well as two or more cells connected in parallel. After determining the amount of energy to be discharged from the parallel group of cells 203, 213, 223, 233, the module controller 201, 211, 221, 231 can discharge the amount of energy through at least one resistor integrated in the parallel-group discharge resistor PDR 202, 212, 222, 232 of the module 200, 210, 220, 230 or as mentioned above through any electric circuit that is able to change the energy content of the cells. Typically, each parallel group of cells 203, 213, 223, 233 has at least one corresponding resistor integrated in the parallel-group discharge resistor PDR 202, 212, 222, 232 in addition to at least one switching device to enable or disable discharging. The switching devices in module 200 in FIG. 2 can be activated via signals $S_1, S_2, \ldots S_n$. The measuring of voltages across the corresponding parallel group of cells 203, 213, 223, 233 is done in module 200 by the module controller 201 via the signals $V_0, V_1, V_2, V_3, \ldots V_{n-1}, V_n$. The step of dissipation of energy can be performed independently of the use of the battery system 100.

Example embodiments of the present invention allow the battery system 100 to determine the necessary balancing and then balance itself locally in the battery module 200, 210, 220, 230 independent whether another module is balancing at the same time or the electric vehicle is in use at all. The local calculation of balancing needs frees up calculating time in the central battery monitoring system 102. In case the balancing is not completed at the time when the battery system 100 can not be discharged any further, the balancing of the corresponding module 200, 210, 220, 230 is paused, for example, by pausing a timer or a waiting loop counting for the time in which a discharge device is connected to the cells. If the battery system 100 is charged again, the paused balancing is continued, for example, by continuing the corresponding timer or the waiting loop. If the battery system 100 is fully charged, the calculation of balancing needs and the necessary balancing steps are performed again.

The module 200, 210, 220, 230 can additionally be equipped with temperature measuring devices that are in total able to represent the module's temperature or as other examples are placed at locations to provide selected batteries' temperatures or cooling fluid temperatures. The measured temperature values are transmitted to the module controller 201, 211, 221, 231.

Each module controller 201, 211, 221, 231 is able to store information that was for example pre-loaded at the time of manufacture, information that the module controller 201, 211, 221, 231 has measured with measuring devices, for example temperature-, voltage-, current sensors, and information that it has received via its communication links 103, including but not limited to:

Initial capacity of each parallel group of cells 203, 213, 223, 233,

A measurement or an estimation of the present capacity or state-of-charge of each parallel group of cells 203, 213, 223, 233 or each battery module 200, 210, 220, 230, A mapping of voltage versus state of charge versus temperature remaining for the parallel group of cells 203, 213, 223, 233. The mapping could be represented for example as a table stored in the internal memory within the module controller 201, 211, 221, 231, The voltage limits of the parallel group of cells 203, 213, 223, 233 or the battery module 200, 210, 220, 230, The value of the individual parallel-group discharge resistors PDR 202, 212, 222, 232, The number of charge and/or discharge cycles or if not discharged or charged to specific threshold values the number of equivalent charge and/or discharge cycles, Temperature values of the module (minimum, maximum, average and/or temperature over time), A production identification such as the production serial number or any similar module-, battery type- or production information including software/firmware information, owner's information (e.g., name, date purchased, country purchased in, company purchased from, warranty information), The total time in which the module was not used, for example the time between production and first use, the time not actively connected to a load and/or to the communication links 103 (e.g., time interval of the battery module 200, 210, 220, 230 as a spare part). Instead or in addition of the time interval also the specific date and time events can be stored, A log file giving information about the date and time of various predefined events, Servicing information (for example date of service check of the module 200, 210, 220, 230, service check conducted by whom, replacement of cells), Total discharge or balancing time, Estimate of the leakage current.

Figure 2A:
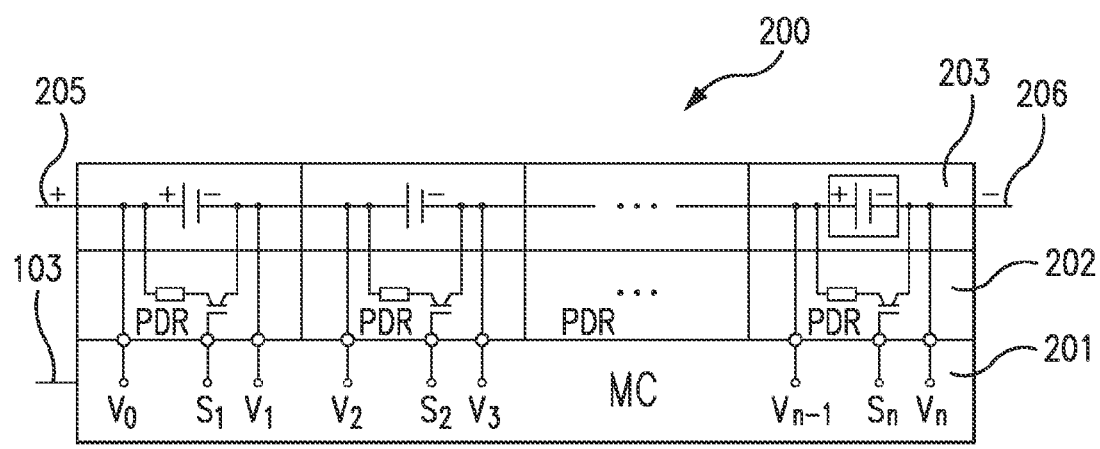
FIG. 2a shows a schematic view of a battery module according to an example embodiment of the present invention.

FIG. 2a shows schematic view of a battery module 200 according to an example embodiment of the present invention.

Figure 2B:
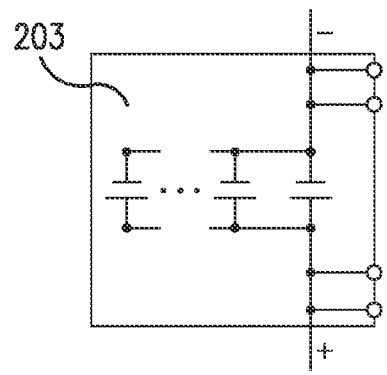
FIG. 2b shows a schematic view of a parallel group of batteries.

The module 200 includes multiple parallel groups of cells 203 which are connected with other parallel groups of cells 203, 213, 223, 233 in series. As already mentioned above, a parallel group of cells 203, 213, 223, 233 includes one cell (as shown in FIG. 2a) as well as two or more cells connected in parallel. The principle of connecting multiple cells in parallel is shown in FIG. 2b. Multiple parallel groups of cells 203 are in FIG. 2a connected in series in the battery module 200 to achieve a desired voltage between the plus terminal 205 (+) and minus terminal 206 (−). The battery module 200 also includes discharge resistors PDR 202 which are connected in series with a switching device across a parallel group of cells 203. The corresponding discharge resistor PDR 202 can be enabled or disabled to discharge energy under the control of the module controller 201. If balancing of voltage of one or more battery modules 200 is necessary, the module controller 201 is able to determine times for each parallel group of cells 203 for which the corresponding discharge resistor PDR 202 is electrically connected to the parallel group of cells 203 to discharge a specific amount of energy. By doing this the corresponding voltage and correspondingly the contained energy of the parallel group of cells 203 is lowered. The module controller 201 or the battery module 200 is also equipped with a communication link 103 which can be, for example, but is not limited to, a serial or parallel, analog or digital, wired or wireless, electrical or optical signal bus to communicate with other modules 200, 210, 220, 230, the BMS 102 or the switchbox 101. The communication link 103 can be a CAN bus which is widely used in vehicles. The module controller 201 also includes a microcontroller or processor including a memory (not shown in FIG. 2a) in which a program for execution or preprogrammed and acquired data is saved or can be stored and if necessary also can be changed. The microcontroller controls the on and off time of the parallel group discharge resistors PDR 202 via Signals $S_1, S_2, \ldots S_n$. Any external access to the memory or the module controller 201, 211, 221, 231, can additionally be secured, for example, by a password including encryption and decryption techniques. This can ensure that the access to internal data and programs is only allowed to qualified personnel or systems.

Figure 3:
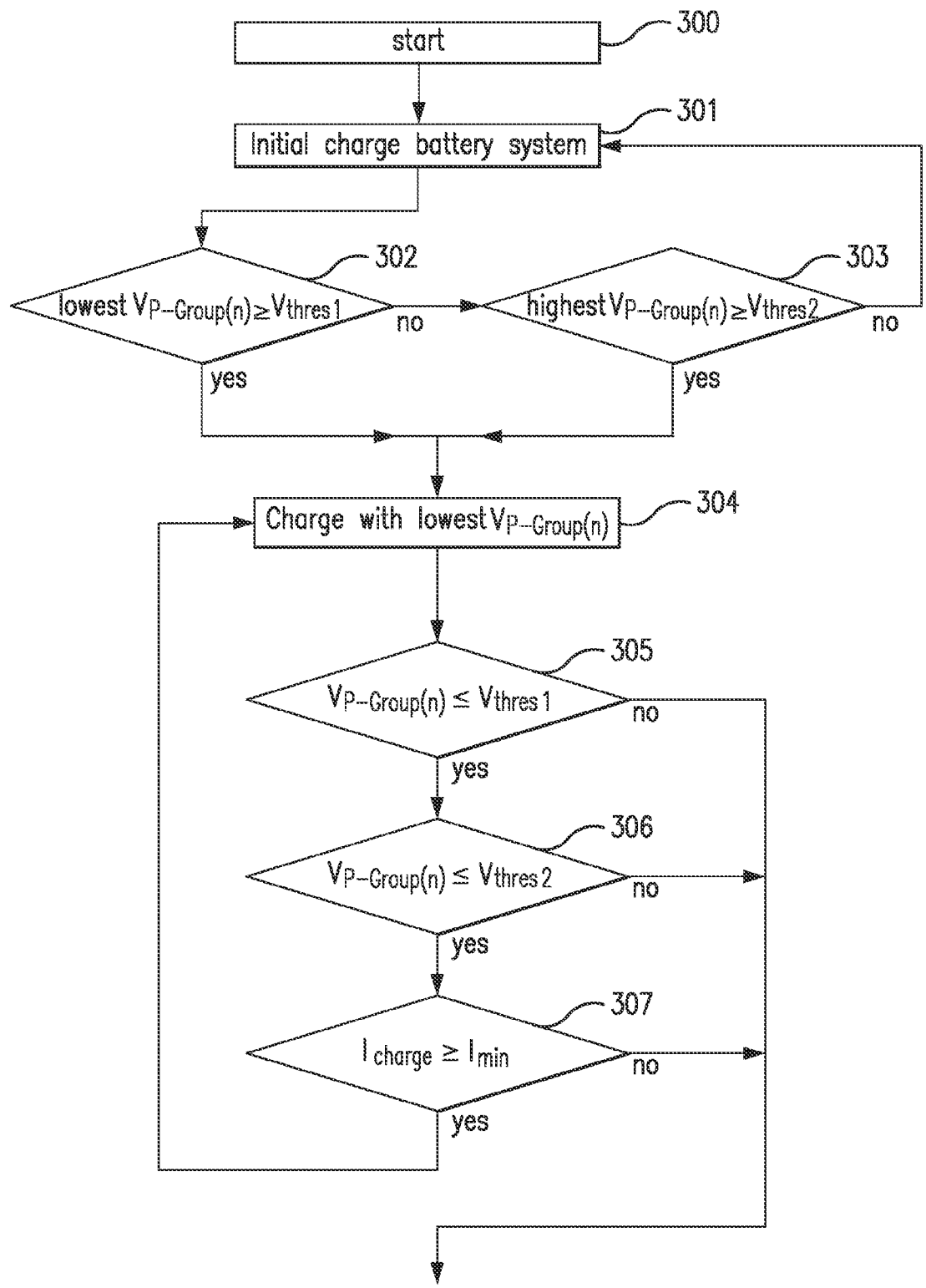
FIG. 3 shows a first part of a flow chart of a methodology of balancing batteries using voltages according to an example embodiment of the present invention.

FIG. 3 shows a first part of a flow chart of a methodology of balancing batteries according to an example embodiment of the present invention. The methodology starts with a starting event indicated in box 300 and then starts initial charging of the battery system 100 in box 301. The battery modules 200, 210, 220, 230 are charged, for example, with constant current, until either the lowest voltage of the parallel groups of cells 203, 213, 223, 233 is greater or equal to a corresponding first threshold voltage $V_{thres1}$ in box 302 or until the highest voltage of the parallel groups of cells 203, 213, 223, 233 is greater or equal to a corresponding second threshold voltage $V_{thres2}$ value in box 303. The first threshold voltage $V_{thres1}$ may be, for example, a full charge voltage which may be specified by the BMS 102 or the module controller 201, 211, 221, 231 and which may also be changed by the BMS 102 or the module controller 201, 211, 221, 231 as a function over the lifetime or the load cycles of the battery system 100. The second threshold may be, for example, the maximum allowed cell voltage, minus the sum of all measurement tolerances.

In a next step in box 304 the battery cells of the modules 200, 210, 220, 230 are further charged with keeping the lowest voltage of the parallel groups of cells 203, 213, 223, 233 constant. This is achieved by controlling the overall charging voltage 104 $V_{total}$ which is applied to the battery system 100, such that the corresponding lowest voltage of the parallel groups of cells 203, 213, 223, 233 stays constant. This step is performed while the voltage $V_{P-Group(n)}$ of at least one parallel group of cells 203, 213, 223, 233 is less than or equal to its first threshold voltage $V_{thres1}$ in box 305 and while all voltages $V_{P-Group(n)}$ of the parallel group of cells 203, 213, 223, 233 are less than or equal to the corresponding second threshold voltage $V_{thres2}$ value in box 306 and while the charging current $I_{charge}$ is equal to or above a minimum predefined charging current $I_{min}$ in box 307.

Figure 4:
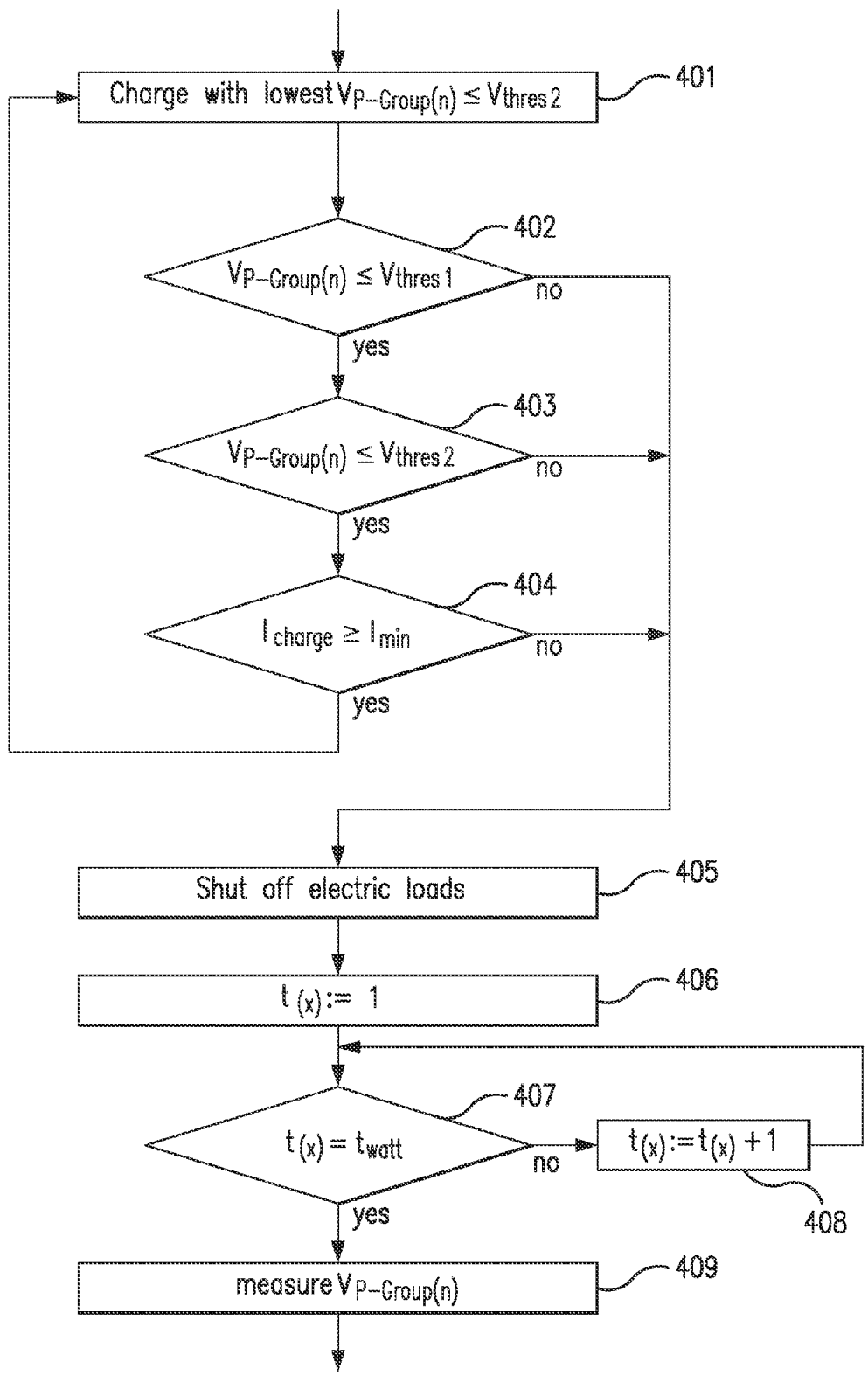
FIG. 4 shows a second part of a flow chart of a methodology of balancing batteries using voltages according to an example embodiment of the present invention.

In FIG. 4 in box 401 the method for balancing batteries is continued with charging the parallel groups of cells 203, 213, 223, 233 in constant-voltage mode by keeping their corresponding voltage $V_{P-Group(n)}$ less than or equal to the second threshold voltage $V_{thres2}$ value, which can be defined, for example, as the maximum allowed battery cell voltage. This charging step is continued while the voltage $V_{P-Group(n)}$ of at least one group of parallel cells 203, 213, 223, 233 is less than or equal to its corresponding first threshold voltage $V_{thres1}$ in box 402 and while the voltages $V_{P-Group(n)}$ of all parallel groups of cells 203, 213, 223, 233 are less than or equal to the corresponding second threshold voltage $V_{thres2}$ values in box 403. The charging step will be stopped if the charging current $I_{charge}$ is less than a first threshold current $I_{thres1}$ which could be, for example, a predefined minimum current $I_{min}$ value.

In the method for balancing batteries, the first threshold voltage $V_{thres1}$ of a parallel group of cells 203, 213, 223, 233 can be chosen to be a predefined full charge voltage $V_{fullcharge}$ of the parallel group of cells 203, 213, 223, 233 and whereas the second threshold voltage $V_{thres2}$ of a parallel group of cells 203, 213, 223, 233 could be chosen to be a predefined maximum allowed voltage $V_{max}$ of the parallel group of cells 203, 213, 223, 233. For optimal performance of charging, the cells the full charge and maximum allowed voltage can additionally change over time as a function of the lifetime or load cycles of the cells or of the use profile of the module 200, 210, 220, 230.

In the next step in box 405, all electrical loads are shut off. Only a minimum necessary power in the battery system 100, e.g., for monitoring and controlling the balancing steps, might still be drawn from the cells in the modules 200, 210, 220, 230. A waiting step provided in box 406, 407 and 408 in the form of a waiting loop allows the cells to settle their internal chemical reactions. This allows measuring a steady state voltage of the cells. The waiting step can also be implemented as a timer function or any other conventional algorithm or even implemented as hardware fulfilling the waiting task. It is the aim in these sub steps to measure a steady state voltage of the parallel group of cells 203, 213, 223, 233 or a voltage that is steady enough for further processing by the module controller 201, 211, 221, 231 and the battery management system 102. The steps represented by boxes 406, 407 and 408 therefore provide an incremental counter to assure the predefined waiting duration $t_{wait}$ before measuring voltages. The length of this waiting step is chosen such that most of the internal dynamic processes of the cells caused by charging are settled as mentioned above. After the waiting period a measuring step of the voltages $V_{P-Group(n)}$ of the parallel groups of cells 203, 213, 223, 233 is performed as provided by box 409. This can be done by the BMS 102 sending a signal to all module controllers 201, 211, 221, 231 to measure their respective voltages $V_{P-Group(n)}$ of all parallel groups of cells 203, 213, 223, 233.

Figure 5:
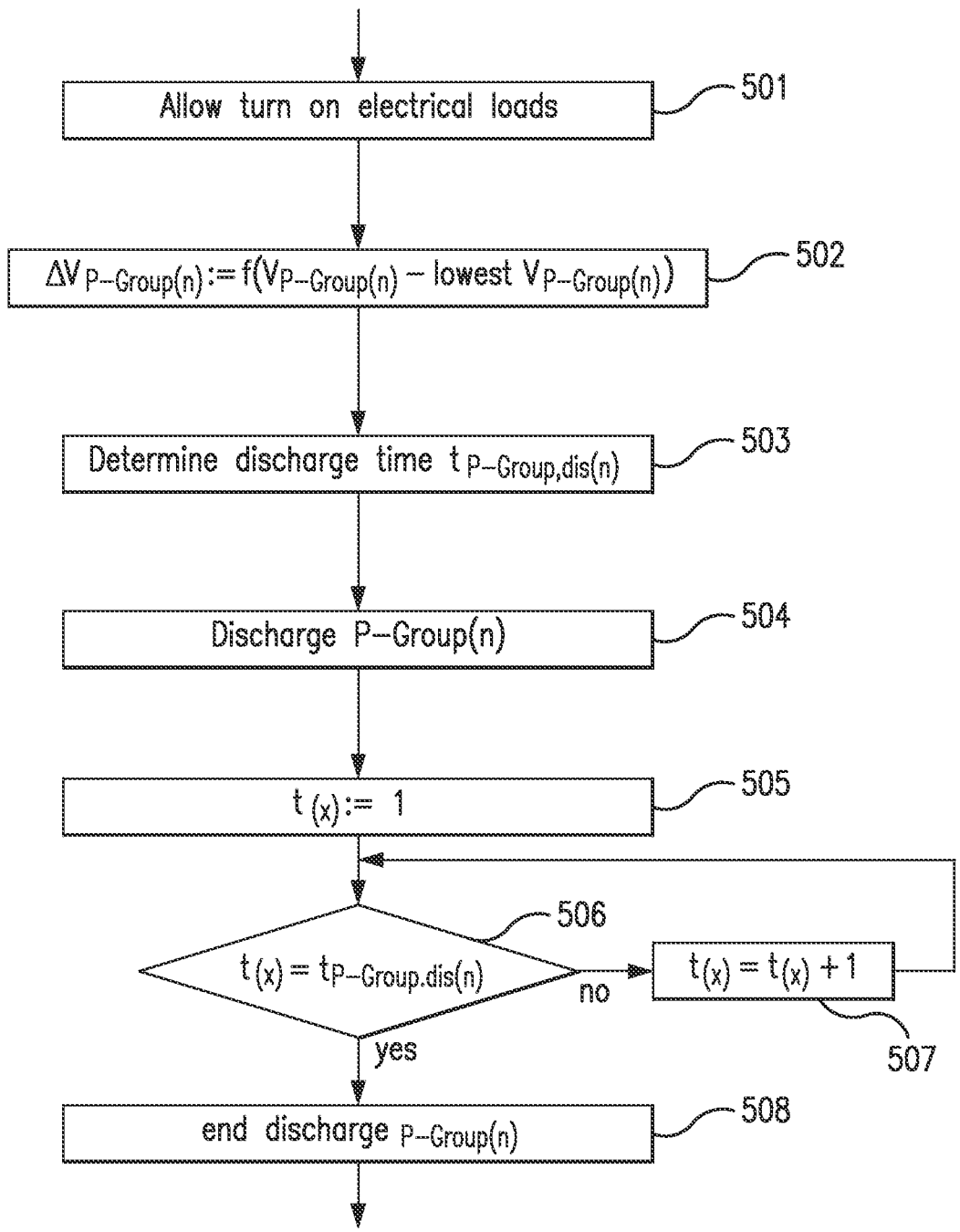
FIG. 5 shows a third part of a flow chart of a methodology of balancing batteries using voltages according to an example embodiment of the present invention.

FIG. 5 shows a third part of a flow chart of the methodology of balancing batteries using voltages according to an example embodiment of the present invention. The module controller 201, 211, 221, 231 transmits a record of all the voltages in their parallel groups of cells 203, 213, 223, 233. In the signal communication bus 103, the module controllers 201, 211, 221, 231 also listen to signal messages from the other parallel groups of cells 203, 213, 223, 233 in the battery system 100 and note the lowest measured voltage. After measuring is completed, the electrical loads are allowed to turn on again. For each parallel group of cells 203, 213, 223, 233, the corresponding module controller 201, 211, 221, 231 calculates the difference of the measured module voltages and the lowest voltage in the entire battery system 100:

$$\Delta V_{P\text{-}Group(n)} = f(V_{P\text{-}Group(n)} - \text{lowest } V_{P\text{-}Group(n)})$$

The calculated voltage difference $\Delta V_{P\text{-}Group(n)}$ corresponds to a specific amount of energy difference in the parallel group of cells 203, 213, 223, 233. This respective energy difference is then determined for each parallel group of cells 203, 213, 223, 233 as indicated in box 502. For determining this, for example, a voltage and temperature to state-of-charge table and an estimation of the parallel group of cells' electrical capacity can be used. The table can be stored for example in the memory of the module controller 201, 211, 221, 231.

The next step is to calculate the time $t_{P\text{-}Group,dis(n)}$ required to discharge the determined energy difference for each parallel group of cells 203, 213, 223, 233 through the module's parallel group discharge resistor PDR 202, 212, 222, 232 as indicated in box 503. The calculation of time can be done by considering the ohmic value of the respective resistors and the determined voltage differences. In box 504, the discharging of the corresponding parallel groups of cells 203, 213, 223, 233 is initiated by the module controller 201, 211, 221, 231. An individual timer for each group of parallel cells 203, 213, 223, 233 is started, represented by boxes 505, 506, 507, to discharge the corresponding energy amount of the cells with the parallel group discharge resistor PDR 202, 212, 222, 232.

The discharging of batteries with the PDR 202, 212, 222, 232 can be done any time whether the battery system 100 is in use, e.g., for driving an electric vehicle, or whether it is not in use. In case the balancing is not completed at the time when the battery system 100 can not be discharged any further, the balancing of the corresponding module 200, 210, 220, 230 is paused, for example, by pausing a timer or a waiting loop counting for the time in which a discharge device is connected to the cells. If the battery system 100 is charged again, the paused balancing is continued, for example, by continuing the corresponding timer or the waiting loop. If the battery system 100 is fully charged, the calculation of balancing needs and the necessary balancing steps are performed again.

An alternative method for balancing voltage for a multi-cell battery system 100 uses a normalized value $X_{norm(n)}$ of the parallel groups of cells 203, 213, 223, 233 that represents a fraction of the capacity of the cells. The measured voltage is transformed to a normalized value by using, for example, functions, transformation rules, value tables or approximations. An advantage is that it allows the battery system 100 to operate optimally even when cells or parallel groups of cells 203, 213, 223, 233 within the battery system 100 are mismatched, for example, in capacity, operating voltage, temperature dependence, or all three. Therefore, it can be advantageous to charge and balance parallel groups of cells 203, 213, 223, 233 based on a normalized value $X_{norm(n)}$ rather than the actual measured voltage, so all the cells are being compared on a scale that is universally applicable to all the parallel groups of cells 203, 213, 223, 233. This normalized value must communicate enough information for each parallel group of cells 203, 213, 223, 233 to calculate balancing timers and first and second thresholds. Charging and balancing using voltages converted to a normalized scale allows the battery system 100 to adapt to mismatched cells. Normalizing the voltage is any manner of transforming a measured voltage into another number, for example, by using functions, transformation rules, value tables or approximations. The normalized voltage is the output of a transformation that may include as inputs measured voltage, temperature, state of charge, or any other measured or estimated state variable or the previous state of any measured or estimated state variable of the parallel groups of cells 203, 213, 223, 233. It should be apparent that there are multiple methods of transforming these measured values into a normalized value $X_{norm(n)}$ that are basically similar.

For example, the voltages could be normalized onto the state of charge scale. In this case, the same lookup table or function used to transform voltage and temperature into state of charge while the cells are at rest could be used to transform the cell voltage and temperatures onto a normalized state of charge scale while the cells are in use or are charging. The first and second threshold voltages would now be first and second threshold normalized voltages on the state of charge scale.

Voltage can be normalized based on the scale of fractional charge, commonly called state-of-charge. For example, the actual parallel group of cells 203, 213, 223, 233 may be at a voltage of 3.2V and the temperature is at 20° C. (degree Celsius). The 3.2V and 20° C. is looked up in the state-of-charge table, and the corresponding value is 30% state-of-charge. If the parallel group of cells 203, 213, 223, 233 begins to be charged at some current, the voltage may immediately rise to 3.5V and temperature stays the same at 20° C. This 3.5V and 20° C. is looked up in the state-of-charge table, and the corresponding value is 60% state-of-charge. The parallel group of cells 203, 213, 223, 233 has only been charged for a few seconds, so its actual state of charge is still 30%, but the normalized voltage in this case at this moment in time is now 60%.

Voltage can be normalized based on the scale of remaining charge. For example, the actual parallel group of cells 203, 213, 223, 233 may be at a voltage of 3.2V and the temperature is at 20° C. The 3.2V and 20° C. is looked up in the state-of-charge table, and the corresponding value is 30% state-of-charge, and the capacity of the parallel group of cells is presently estimated to be 200 Ah (Amperehours), so the remaining charge is estimated to be 60 Ah. If the parallel group of cells 203, 213, 223, 233 begins to be charged at some current, the voltage may immediately rise to 3.5V and temperature stays the same at 20° C. This 3.5V and 20° C. is looked up in the state-of-charge table, and the corresponding value is 60% state-of-charge. No change is introduced in the estimated capacity of the cells. The parallel group of cells 203, 213, 223, 233 has only been charged for a few seconds, so it actual remaining charge is still 60 Ah, but the normalized voltage in this case at this moment in time is now 120 Ah.

Voltage can be normalized to the voltage of a different type of cell, for example Cell Type B, and normalized based on state of charge. This may be advantageous, for example, if new cells are used to replace old cells in an old battery pack or module 200, 210, 220, 230. The actual parallel group of cells 203, 213, 223, 233 of Cell Type A may be at a voltage of 3.2V and the temperature is at 20° C. The 3.2V and 20° C. is looked up in the state-of-charge table for Cell Type A, and the corresponding value is 30% state-of-charge. 30% state of charge and 20° C. is looked up in the state-of-charge table for Cell Type B, and the corresponding value is 2V. If the parallel group of cells 203, 213, 223, 233 begins to be charged at some current, the voltage may immediately rise to 3.5V and temperature stays the same at 20° C. This 3.5V and 20° C. is looked up in the state-of-charge table for Cell Type A, and the corresponding value is 60% state-of-charge. 60% state of charge and 20° C. is looked up in the state-of-charge table for Cell Type B, and the corresponding value is 3V. The parallel group of cells 203, 213, 223, 233 has only been charged for a few seconds, so its actual state of charge is still 30%, but the normalized voltage is now 3V. It should be apparent that the lookup tables can be simplified, made more complex, or transformed in many different manners, and this is an example for clarification.

If the cell balancing system includes at least two parallel groups of cells 203, 213, 223, 233 having different operating voltages, and the system is configured to use at least two different mapping algorithms, each for a different operating voltage of the parallel group of cells 203, 213, 223, 233 to be converted to a normalized value, in particular, to be converted to a normalized voltage value. The amount of balancing discharge that is required is determined by determining a corresponding relative state-of-charge value based on the normalized value, which can be for example a normalized voltage value. With these steps, the BMS 102 is able to balance the different parallel groups of cells 203, 213, 223, 233 even with cells having different nominal operating values. According to example embodiments of the present invention, the system advantageously applies normalized values to handle the correct charging and balancing of mismatched battery types.

The method for balancing voltage determines the balancing steps using the normalized value $X_{norm(n)}$. Even if the cells have, for example, different nominal values, such as the voltage, the balancing method is able to apply the correct values during charging and balancing. Corresponding threshold values of the cells with different parameters can be verified correctly, because they are normalized to the specific cell or parallel group of cells 203, 213, 223, 233. The battery system 100 therefore is able to allow easy servicing and replacement of cells. Because the current trend of battery cell development is to provide future cells with higher energy density, it is likely that, if in the future cells in a battery system 100 have to be replaced, the old cell type is not available anymore. The method for balancing voltage for a multi-cell battery system 100 therefore provides a solution to this situation. It also allows an owner of an electric vehicle to replace part of the cells of his battery system, for example, replace one or more modules, with modules having cells with higher energy content. By doing this, he could account for decreasing maximum mileage over lifetime of his electric vehicle.

The method for balancing voltage is able to handle these different cells in the battery system. It is also possible to replace one or more parallel groups of cells 203, 213, 223, 233 in the module 200, 210, 220, 230.

The battery management system 102 or the module controller 201, 211, 221, 231 are arranged to determine or retrieve the normalized values $X_{norm(n)}$ of the corresponding parallel group of cells 203, 213, 223, 233. This can be done, for example, by information of the cells being stored in the module controller's memory which can be read-out by the module controller 201, 211, 221, 231 and can be communicated to the battery management system 102.

Figure 6:
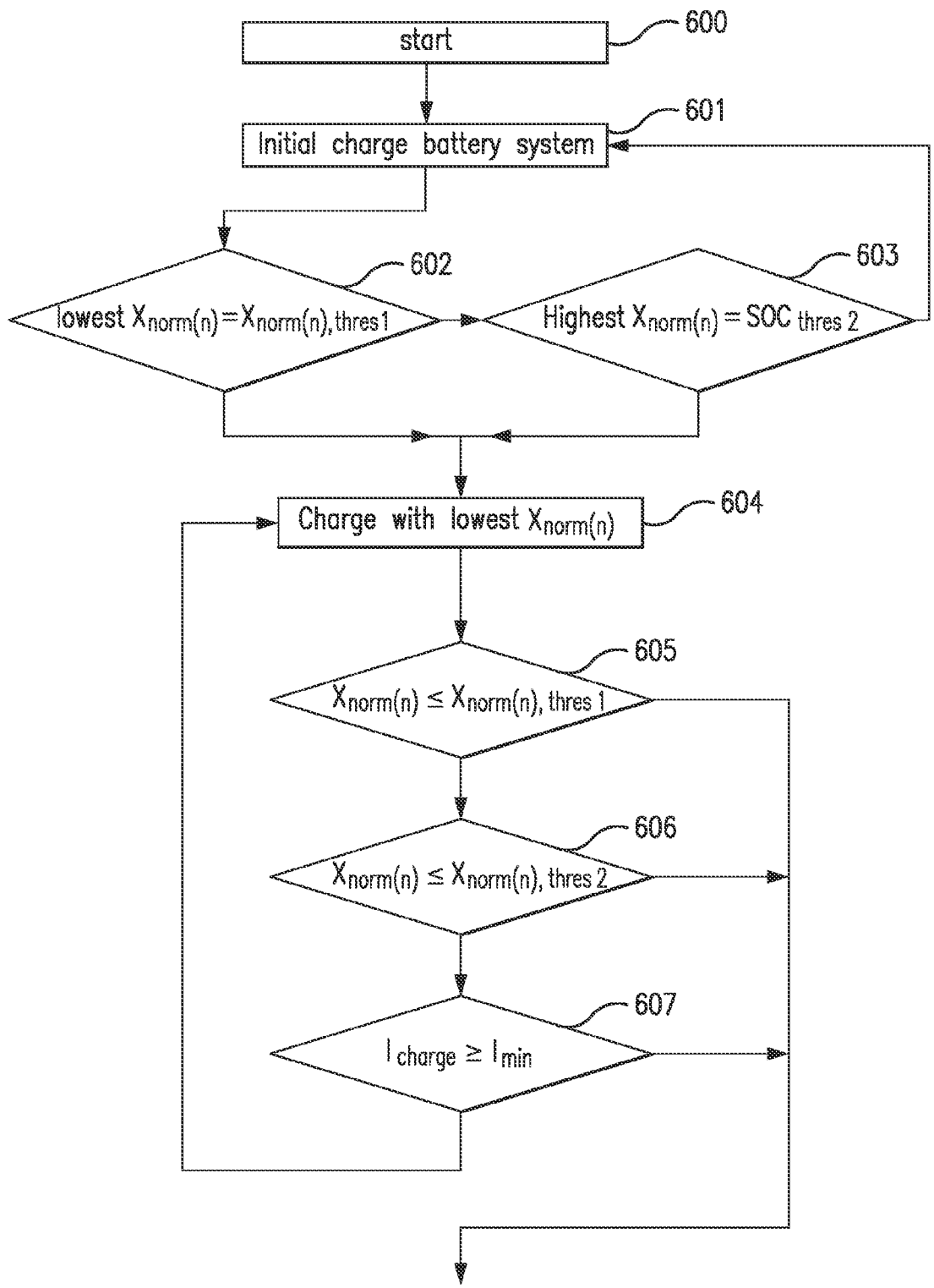
FIG. 6 shows a first part of a flow chart of a methodology of balancing batteries using state-of-charge values according to an example embodiment of the present invention.

FIG. 6 shows a first part of a flow chart of this aspect of the methodology of balancing batteries using normalized values $X_{norm(n)}$ of the cells. The methodology starts with a start event in box 600 and then starts charging the battery system 100 in box 601. The modules are charged, for example, with constant current, until either the lowest normalized value $X_{norm(n)}$ of the parallel groups of cells 203, 213, 223, 233 is greater or equal to a corresponding first normalized threshold value $X_{norm(n), thres1}$ in box 602 or until the highest normalized value $X_{norm(n)}$ of the parallel groups of cells 203, 213, 223, 233 is greater or equal to a corresponding second normalized threshold value $X_{norm(n), thres2}$ in box 603.

In a next step in box 604, the cells of the modules 200, 210, 220, 230 are further charged in constant voltage mode keeping the lowest normalized value $V_{norm(n)}$ of the parallel groups of cells constant. In order to achieve this, the overall charging voltage $V_{total}$ 104 of the battery system 100 as shown in FIG. 1 is controlled. This step is performed while the normalized value $X_{norm(n)}$ of at least one parallel group of cells 203, 213, 223, 233 is less or equal to its first normalized threshold value $X_{norm(n), thres1}$ in box 605 and while at least one parallel group of cells 203, 213, 223, 233 is less or equal to its second normalized threshold value $X_{norm(n), thres2}$ in box 606 and while the charging current $I_{charge}$ is greater or equal to a minimum predefined charging current $I_{min}$ in box 607.

Figure 7:
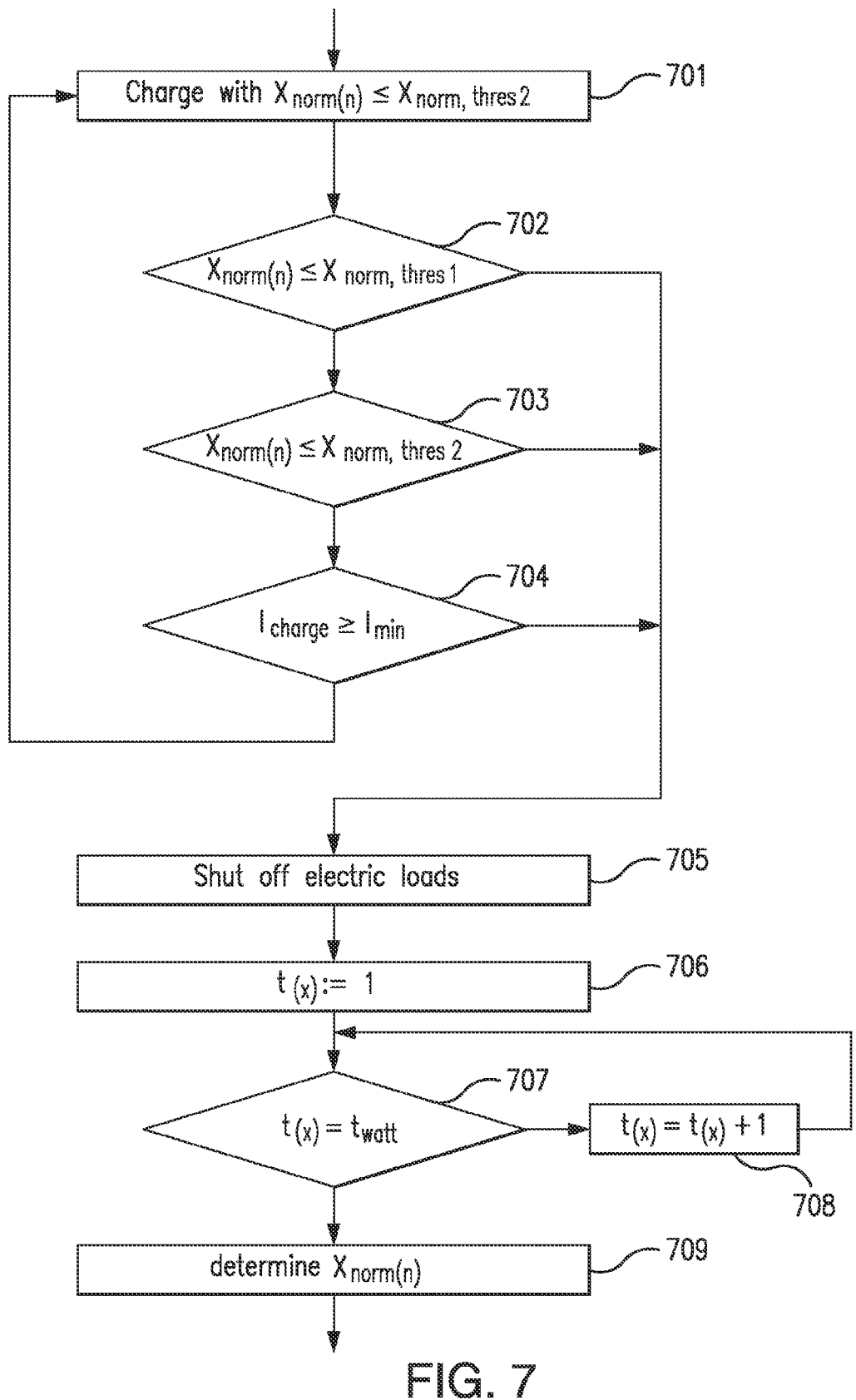
FIG. 7 shows a second part of a flow chart of a methodology of balancing batteries using state-of-charge values according to an example embodiment of the present invention.

In FIG. 7 in box 701, the method for balancing batteries is continued with charging the parallel groups of cells 203, 213, 223, 233, for example, in constant voltage mode, by keeping the normalized value $X_{norm(n)}$ of the parallel groups of cells 203, 213, 223, 233 less or equal to the second normalized threshold value $X_{norm(n), thres2}$. The charging step is continued while the normalized value $X_{norm(n)}$ of the parallel groups of cells 203, 213, 223, 233 is less or equal to its first normalized threshold value $X_{norm(n), thres1}$ in box 702 and while all normalized values $X_{norm(n)}$ of the parallel groups of cells 203, 213, 223, 233 are less or equal to their second normalized threshold value $X_{norm(n), thres2}$ in box 703. This charging step will finally be stopped if the charging current $I_{charge}$ is less than a first threshold current $I_{thres1}$, whereas the current can be, for example, any predefined minimum current value $I_{min}$, as shown in box 704.

In the method for balancing batteries, the first normalized threshold value $X_{norm(n), thres1}$ of a parallel group of batteries 203, 213, 223, 233 can be chosen to be a predefined normalized full charge value $X_{norm(n), fullcharge}$ of the parallel group of cells 203, 213, 223, 233. The second normalized threshold value $X_{norm(n), thres2}$ of the parallel group of cells 203, 213, 223, 233 can be chosen to be a predefined normalized maximum allowed value $X_{norm(n), max}$. For optimal performance of charging the cells the normalized full charge $X_{norm(n), fullcharge}$ and normalized maximum allowed value $X_{norm(n), max}$ can be a function of the lifetime or load cycles of the battery system 100, the module 200, 210, 220, 230 or the respective parallel group of cells 203, 213, 223, 233.

Figure 8:
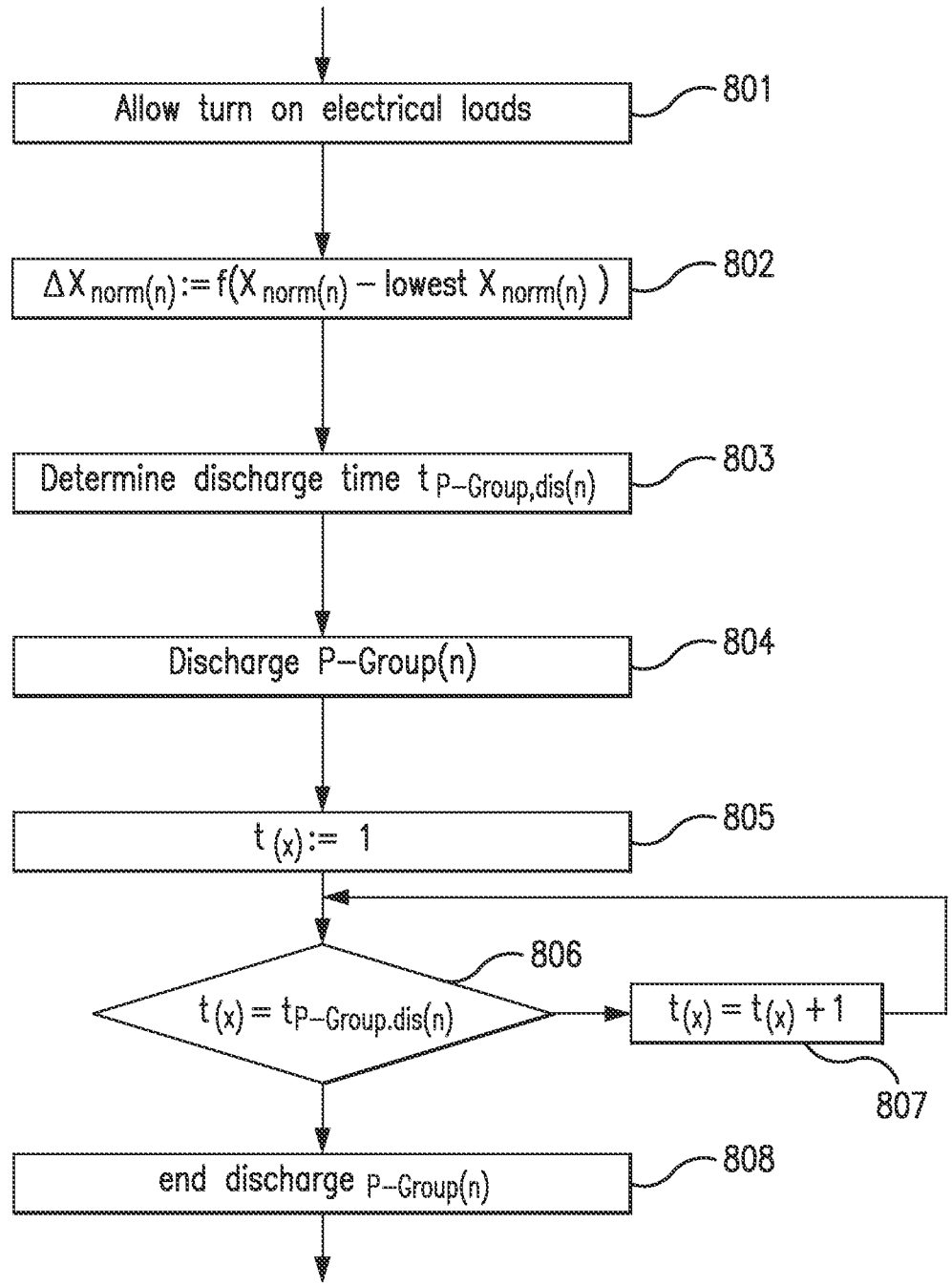
FIG. 8 shows a third part of a flow chart of a methodology of balancing batteries using state-of-charge values according to an example embodiment of the present invention.

In the next step in box 705, all electrical loads are shut off. Only a minimum necessary power, e.g., for monitoring and controlling the balancing steps, might still be drawn from the battery system 100. A following waiting step provided in box 706, 707 and 708 allows the cells to settle their internal chemical reactions caused by charging. The step represented by boxes 706, 707 and 708 provides an incremental counter which incrementally counts a parameter $t_{(x)}$ until it is equal a preset threshold $t_{wait}$, which in sum represents the required waiting period. The length of this waiting step should be chosen such that most of the internal dynamic processes of the cells caused by charging have come to a steady state. After the waiting period, a determining step of the normalized value $X_{norm(n)}$ of each parallel group of cells 203, 213, 223, 233 is performed as provided in box 709. To do this, as mentioned above, all voltages of the parallel group of cells 203, 213, 223, 233 are measured. The measured voltage is transformed to a normalized value by using, for example, functions, transformation rules, value tables or approximations. This can be done, for example, by the battery management system BMS 102 sending a signal to all module controllers 201, 211, 221, 231 to initialize this step. The module controllers 201, 211, 221, 231 determine the voltage and the normalized value $X_{norm(n)}$ of all parallel groups of cells 203, 213, 223, 233, whereas determining the normalized value $X_{norm(n)}$ could also be done in the battery management system BMS 102. In the next step in box 801 of FIG. 8, the electrical loads are allowed to turn on again.

The module controller 201, 211, 221, 231 transmits a record of all normalized values $X_{norm(n)}$ of their parallel group of cells 203, 213, 223, 233 to the battery management system BMS 102. The module controllers 201, 211, 221, 231 also listen on the signal communication bus 103 to signal messages from the other parallel groups of cells 203, 213, 223, 233 and note the lowest determined normalized value $X_{norm(n)}$ in the entire battery system 100. The lowest normalized value $X_{norm(n)}$ can also be determined by the battery management system BMS 102 acting as a master device on the bus and listening or receiving the records of the module controllers 201, 211, 221, 231 and then determining and communicating the lowest normalized value $X_{norm(n)}$ to the modules 200, 210, 220, 230. For each parallel group of cells 203, 213, 223, 233, the corresponding module controller 201, 211, 221, 231 or the battery management system BMS 102 determines the individual energy difference $\Delta P_{P\text{-}Group\,(n)}$ of the corresponding parallel group of cells 203, 213, 223, 233 in relation to the lowest normalized value $X_{norm(n)}$ in the entire battery system 100 in box 802:

$$\Delta A_{P\text{-}Group\,(n)} = f(X_{norm,\,P\text{-}Group(n)} - \text{lowest } X_{norm,\,P\text{-}Group(n)})$$

The next step is to determine the time $t_{P\text{-}Group,dis(n)}$ required to discharge the identified energy difference for each parallel group of cells 203, 213, 223, 233 through the parallel discharge resistor PDR 202, 212, 222, 232 or any discharge circuit as indicated in box 803. In box 804, the discharging of the corresponding parallel group of cells 203, 213, 223, 233 is initiated by the module controller 201, 211, 221, 231. An individual timer for each parallel group of cells 203, 213, 223, 233 is started, represented by boxes 805, 806, 807, to turn the discharge circuit of the corresponding parallel group of cells 203, 213, 223, 233 on. The discharging can be done any time whether the battery system 100 is in use, e.g., for driving an electric vehicle, or whether it is not in use. If the energy content of the battery system 100 is less or equal to its minimum energy content, the discharging of the parallel group of cells 203, 213, 223, 233 is paused. If the battery system 100 is charged again, the pausing is canceled and the discharging continues. If the charging is continued to result in a full charge of the battery system 100, the method of balancing batteries is restarted. With the step in box 808, the methodology of balancing the multi-cell battery system 100 ends.

For the steps of discharging energy the battery system 100 could use a parallel group discharge resistor PDR 202, 212, 222, 232 or any other discharge circuit. One could also use electronic circuits that transfer the necessary amount of energy between the cells to balance the battery system 100. The step of determining the discharge energy may be a step of determining how much energy needs to be relocated to or from at least one cell. One could therefore determine the sum of energy in all cells that is above the energy level of the cell with the lowest energy. In a next step, the average additional amount of energy transferred to the cell with the lowest amount of energy has to be determined, which gives the total amount of energy to which all parallel groups of cells need to be charged or discharged by transferring energy. In the battery system 100 there are cells that are receiving energy from other cells and cells that deliver energy to other cells and there may also be cells that already have the required, average amount of energy. In most cases, the transfer of energy can only be done with energy losses. Therefore, this method has to take into account the energy losses when determining the amount of energy that one parallel group of cells 203, 213, 223, 233 cell receives or delivers to other parallel groups of cells.

For the method of balancing batteries in a multi-cell battery system using a normalized value $X_{norm(n)}$, the following example shall show additional aspects.

A specific battery system is built with ten modules, each with ten parallel groups of cells 203, 213, 223, 233. The original cell chemistry has a nominal voltage of 3.6V, with a minimum voltage of 3.0V and a maximum voltage of 4.2V. The nominal voltage is therefore 360V, spread across one hundred parallel groups of cells.

At a given time, e.g., after being in use multiple years with an electric vehicle, this battery system needs to be serviced because of one defective module. By the time the defective module needs to be replaced, the development of cells has evolved and now new cells are available having a nominal voltage of 4.0V, with a minimum voltage of 3.3V and a maximum voltage of 4.7V. In current battery system's new cells with new and different specifications can not be used in that module or used together with modules that use different type of cells.

The described method for balancing cells that uses a normalized value $X_{norm(n)}$ for the balancing algorithm can balance the system with modules having different types of cells. A replacement module could have, for example, nine parallel groups of cells rather than ten parallel groups of cells, and the battery system voltage is therefore virtually unchanged. If the normalized full charge value $X_{norm(n)}$ is at this point 92%, then this might correlate to 4.1V for the modules with the older types of cells, but 4.6V for the new module. The modules with the older type of cells will converge on 4.1V, while the new module converges on 4.6V as the group of parallel cells 203, 213, 223, 233 come into balance. As the electric vehicle is driven, and the battery system 100 discharges, the voltage value of the older module of parallel group of cells 203, 213, 223, 233 will decrease toward 3.0V and the new module of parallel group of cells 203, 213, 223, 233 will discharge toward 3.3V. If there were no leakage resistances, then the cells would come back to the same full-charge voltages when the battery system 100 is recharged. The method of balancing a multi-cell system using the normalized values $X_{norm(n)}$ of the cells will still only require to compensate for differences caused by leakage resistances.

In example embodiments, the methods for balancing voltage in battery system 100 using voltage and using a normalized value $X_{norm(n)}$ can be operated together. If in a system that uses voltage to balance the battery system 100, one module 200, 210, 220, 230 is replaced with a module having different cells with different electric characteristics, the new module 200, 210, 220, 230 can normalize its voltage to the voltage of the old module 200, 210, 220, 230. The new module is therefore pretending to be the module 200, 210, 220, 230 that was replaced in respect of its voltage. No major changes in the battery system 100 or the controlling algorithm have to be made. This simplifies servicing the battery system 100.

While example embodiments of the present invention are described above, it should be understood that various modifications and changes may be made thereto without departing from the broader spirit and scope hereof. Accordingly, the foregoing description and drawings are to be regarded in an illustrative rather than a restrictive sense.

What is claimed is:

1. A method for balancing voltage for a multi-cell battery system, the battery system including at least two parallel groups of cells connected in series and the parallel group of cells including at least one cell, comprising:

charging the battery system by keeping a voltage of all parallel groups of cells less than or equal to a second threshold voltage while: (a) at least the voltage of one group of parallel cells is less than or equal to a first threshold voltage; (b) all voltages of the group of parallel cells are less than or equal to a second threshold voltage; and (c) a charging current is above a predefined minimal current;

while electrical loads are shut off, measuring the voltage of each parallel group of cells; and dissipating energy in at least one of the parallel group of cells of an amount that is represented by a voltage difference between the individual parallel group of cells and the parallel group of cells with the lowest voltage.

2. The method according to claim 1, wherein the charging includes a preceding charging, including:

charging the battery system by keeping the lowest voltage of the parallel groups of cells constant, while: (1) at least the voltage of one group of parallel cells is less than or equal to the first threshold voltage; (2) all voltages of the group of parallel cells are less than or equal to the second threshold voltage; and (3) the charging current is above a predefined minimal current.

3. The method according to claim 1, wherein the charging includes a preceding charging, including:

charging the battery system until at least one of (a) the lowest voltage of the parallel group of cells is greater than or equal to its first threshold voltage and (b) the highest voltage of the parallel group of cells is greater than or equal to its second threshold voltage value.

4. The method according to claim 1, wherein the first threshold voltage is a predefined full charge voltage of the parallel group of cells and wherein the second threshold voltage is a predefined maximum full charge voltage of the parallel group of cells.

5. The method according to claim 1, wherein at least one of (a) the first and (b) the second threshold voltage is a function of at least one of (a) lifetime and (b) load cycles of the parallel group of cells.

6. The method according to claim 1, wherein the dissipation of energy includes determining a corresponding time required to discharge via at least one discharge circuit an amount of energy represented by the voltage difference between the individual parallel group of cells and the parallel group of cells with the lowest voltage.

7. The method according to claim 1, wherein at least one module controller is allocated to multiple parallel group of cells and is adapted to at least measure corresponding voltages of the parallel group of cells, and to turn at least one discharge circuit of the parallel group of cells on and off, and to communicate information of the parallel group of cells to a battery management system.

8. The method according to claim 1, whereas the dissipation of energy is performed independently of use of the battery system.

9. The method according to claim 1, further comprising a predefined waiting period with no charging or discharging of the battery system before measuring the voltages of the parallel groups of cells.

10. A method for balancing voltage for a multi-cell battery system, the battery system including at least two parallel groups of cells connected in series and the parallel groups of cells including at least one cell, a normalized value of the parallel group of cells being determined that depends at least on a voltage of the cells and represents a fraction of a capacity stored in the corresponding parallel group of cells, comprising:

charging the battery system by keeping a characteristic normalized value of the parallel group of cells less than or equal to a second threshold normalized value of the parallel group of cells while: (a) at least the normalized value of one group of parallel cells is less than or equal to a first threshold normalized value; (b) at least the normalized value of one group of parallel cells is less than or equal to a second threshold normalized value; and (c) the charging current is above a predefined minimal current;

while electrical loads are shut off, measuring the voltage of each parallel group of cells and determining the normalized value of each parallel group of cells; and dissipating energy in at least one of the parallel group of cells of an amount that is represented by a difference between the corresponding normalized value and a lowest normalized value of all parallel group of cells.

11. The method according to claim 10, wherein the charging of the battery system includes a preceding charging, including:

charging the battery system by keeping the lowest normalized value of the parallel groups of cells constant, while: (a) at least the normalized value of one parallel group of cells is less than or equal to the first threshold normalized value; (b) all normalized values of the parallel group of cells are less than or equal to the second threshold normalized value; and (c) a charging current is above a predefined minimal current.

12. The method according to claim 10, wherein the charging of the battery system includes a preceding charging, including:

charging the battery system until at least one of (a) the lowest normalized value of the parallel group of cells is greater than or equal to the first threshold normalized value; and (b) a highest normalized value of the parallel group of cells is greater or equal to the second threshold normalized value.

13. The method according to claim 10, wherein the normalized value represents at least one of (a) a normalized state-of-charge-value, (b) a normalized Amperehour-value, (c) a normalized Voltage-value, and (d) a normalized Kilowatthour-value of the parallel group of cells.

14. The method according to claim 10, wherein the first threshold normalized value is a predefined full charge normalized value of the parallel group of cells and wherein the second threshold normalized value is a predefined maximum full charge normalized value of the parallel group of cells.

15. The method according to claim 10, wherein the value of at least one of (a) the first and (b) the second threshold normalized value depends on at least one of (a) a lifetime and (b) load cycles of the parallel group of cells.

16. The method according to claim 10, wherein the dissipation of energy includes determining a corresponding time required to discharge via at least one discharge circuit an amount of energy represented by the difference between the corresponding normalized value of the parallel group of cells and the parallel group of cells with the lowest normalized value.

17. The method according to claim 10, wherein at least one module controller is allocated to multiple parallel group of cells and is adapted to at least determine the corresponding normalized value of the parallel group of cells, and to turn the discharge circuit of the parallel group of cells on and off, and to communicate information of the parallel group of cells to a battery management system.

18. The method according to claim 10, wherein the dissipation of energy is performed independently of use of the battery system.

19. The method according to claim 10, further comprising a predefined waiting period with no charging or discharging of the battery system before determining the normalized values of the parallel groups of cells.

20. A cell balancing system, comprising:
at least two parallel groups of cells connected in series, the parallel group of cells including at least one battery cell;
at least one discharge circuit allocated to a corresponding parallel group of cells; and
at least one module controller adapted to control multiple parallel groups of cells, the module controller interconnected with a battery monitoring system and other module controllers; and
a memory device with instructions adapted to execute at least one of:
(a) a method including:
charging the battery system by keeping a voltage of all parallel groups of cells less than or equal to a second threshold voltage while: (a) at least the voltage of one group of parallel cells is less than or equal to a first threshold voltage; (b) all voltages of the group of parallel cells are less than or equal to a second threshold voltage; and (c) a charging current is above a predefined minimal current;
while electrical loads are shut off, measuring the voltage of each parallel group of cells; and
dissipating energy in at least one of the parallel group of cells of an amount that is represented by a voltage difference between the individual parallel group of cells and the parallel group of cells with the lowest voltage; and
(b) a method including:
charging the battery system by keeping a characteristic normalized value of the parallel group of cells less than or equal to a second threshold normalized value of the parallel group of cells while: (a) at least the normalized value of one group of parallel cells is less than or equal to a first threshold normalized value; (b) at least the normalized value of one group of parallel cells is less than or equal to a second threshold normalized value; and (c) the charging current is above a predefined minimal current;
while electrical loads are shut off, measuring the voltage of each parallel group of cells and determining the normalized value of each parallel group of cells; and
dissipating energy in at least one of the parallel group of cells of an amount that is represented by a difference between the corresponding normalized value and a lowest normalized value of all parallel group of cells.

21. The cell balancing system according to claim 20, wherein the system includes at least two parallel groups of cells having different values for nominal voltage or nominal capacity or nominal amperehour or nominal watthour.

22. The cell balancing system according to claim 20, wherein the system includes at least two parallel groups of cells having different operating voltages, and wherein the system is configured to use at least two different mapping algorithms, each for a different operating voltage to convert to at least one of (a) a normalized value and (b) a normalized voltage value.

23. The cell balancing system according to claim 22, wherein an amount of balancing discharge required is determined by determining a corresponding relative state-of-charge value based on at least one of (a) a normalized value and (b) a normalized voltage value.

24. An electric vehicle, comprising:
a cell balancing system, including:
at least two parallel groups of cells connected in series, the parallel group of cells including at least one battery cell;
at least one discharge circuit allocated to a corresponding parallel group of cells; and
at least one module controller adapted to control multiple parallel groups of cells, the module controller interconnected with a battery monitoring system and other module controllers; and
a memory device with instructions adapted to execute at least one of:
(a) a method including:
charging the battery system by keeping a voltage of all parallel groups of cells less than or equal to a second threshold voltage while: (a) at least the voltage of one group of parallel cells is less than or equal to a first threshold voltage; (b) all voltages of the group of parallel cells are less than or equal to a second threshold voltage; and (c) a charging current is above a predefined minimal current;
while electrical loads are shut off, measuring the voltage of each parallel group of cells; and
dissipating energy in at least one of the parallel group of cells of an amount that is represented by a voltage difference between the individual parallel group of cells and the parallel group of cells with the lowest voltage; and
(b) a method including:
charging the battery system by keeping a characteristic normalized value of the parallel group of cells less than or equal to a second threshold normalized value of the parallel group of cells while: (a) at least the normalized value of one group of parallel cells is less than or equal to a first threshold normalized value; (b) at least the normalized value of one group of parallel cells is less than or equal to a second threshold normalized value; and (c) the charging current is above a predefined minimal current;
while electrical loads are shut off, measuring the voltage of each parallel group of cells and determining the normalized value of each parallel group of cells; and
dissipating energy in at least one of the parallel group of cells of an amount that is represented by a difference between the corresponding normalized value and a lowest normalized value of all parallel group of cells.

* * * * *